United States Patent [19]
Yamaguchi et al.

[11] Patent Number: 5,887,939
[45] Date of Patent: Mar. 30, 1999

[54] ROOF MODULE FOR AUTOMOBILE

[75] Inventors: Atsuyoshi Yamaguchi; Minoru Kubota, both of Shizuoka, Japan

[73] Assignee: Yazaki Corporation, Tokyo, Japan

[21] Appl. No.: 880,515

[22] Filed: Jun. 23, 1997

[30] Foreign Application Priority Data

Jun. 24, 1996 [JP] Japan .................................. 8-163441

[51] Int. Cl.⁶ ...................................................... B60J 7/00
[52] U.S. Cl. ...................... 296/210; 296/214; 296/146.7; 296/37.7
[58] Field of Search ................................ 296/214, 146.7, 296/37.7; 439/34, 342, 343

[56] References Cited

U.S. PATENT DOCUMENTS

| | | | |
|---|---|---|---|
| 4,100,372 | 7/1978 | Hypolite | 296/37.7 |
| 4,783,110 | 11/1988 | Beukema et al. | 296/37.7 |
| 4,818,010 | 4/1989 | Dillon | 296/37.7 |
| 4,867,498 | 9/1989 | Dekphia et al. | 296/37.7 |
| 4,888,072 | 12/1989 | Ohlenfrost et al. | 296/37.7 |
| 4,893,867 | 1/1990 | Hilborn et al. | 296/214 |
| 4,902,068 | 2/1990 | Dowd et al. | 296/214 |
| 5,040,990 | 8/1991 | Suman et al. | 439/34 |
| 5,154,617 | 10/1992 | Suman et al. | 439/34 |
| 5,186,517 | 2/1993 | Gilmore et al. | 296/37.7 |
| 5,269,060 | 12/1993 | Dowd et al. | 296/214 |
| 5,303,970 | 4/1994 | Young et al. | 296/37.7 |
| 5,309,634 | 5/1994 | Van Order et al. | 439/34 |
| 5,484,186 | 1/1996 | Van Order et al. | 296/214 |
| 5,522,638 | 6/1996 | Falcoff et al. | 296/37.7 |

FOREIGN PATENT DOCUMENTS

| | | | |
|---|---|---|---|
| 1-307180 | 12/1989 | Japan . | |
| 213464 | 8/1984 | United Kingdom | 296/214 |

*Primary Examiner*—D. Glenn Dayoan
*Assistant Examiner*—Kiran Patel

[57] ABSTRACT

A roof module for automobile in which a function-intensive unit is mounted on a body of an automobile, electrical modules, and control circuits for the electrical modules, and the unit is combined with a formed ceiling to easily distribute the wire harness and easily mount functional electrical modules such as room mirrors, resulting in improved workability. The roof module for automobile comprises: a formed ceiling mounted to an inner surface of a ceiling portion of a vehicle; a function-intensive unit attached to a front driver's seat side of the formed ceiling, the function-intensive unit including a unit case with a plurality of functional parts and a control circuit board for the functional parts, and a unit side connector connected to the control circuit board at an upper surface of the unit case; a roof wire harness preliminarily locked to the formed ceiling through a preliminary locking member of the roof wire harness, the roof wire harness including a reception connector being connected to the unit side connector, and a fixing member for fixing the formed ceiling and the reception connector to the ceiling portion.

9 Claims, 17 Drawing Sheets

«5,887,939»

ROOF MODULE FOR AUTOMOBILE

BACKGROUND OF THE INVENTION

1. Field of the Invention

The present invention relates to a roof module for automobile, and more particularly to a roof module in which a function-intensive unit is formed to concentrate a variety of room fittings mounted on a body of an automobile, electrical modules, and control circuits for the electrical modules, and the unit and a roof wire harness are easily mounted with the aid of a formed ceiling which is mounted to a ceiling portion of the automobile.

2. Description of the Related Art

FIG. 24 shows a variety of parts which are mounted to a roof portion of a ceiling portion of an automobile. At the ceiling portion a are present a formed ceiling b, a roof wire harness c, room lamps d, and lamp covers e, as well as other parts such as rear-view mirrors, sun visors, switches, and magnetic sensors which are not illustrated in the figure.

At the mounting of those parts to the vehicle body, at first, the roof wire harness c is fixed to the ceiling portion a with many clips f, and after the formed ceiling b is mounted, parts such as the room lamps d, switches therefor, and the rear-view mirrors are secured to the vehicle body with screws or the like in such a manner as to be inserted into the formed ceiling b. At that moment, for electrical modules which are required to be connected to the roof wire harness c, connectors g are drawn out of holes b1 which are formed on the formed ceiling b, and are connected, for instance, to connector portions d1 of the room lamps d.

In the distributing work for the electrical wires and the assembling work for the fittings, a worker enters a narrow vehicle body, and he or she has to work therein in an upturning posture at all times, so that there is a problem that he or she becomes too tired to continue the works for a long period of time.

To solve the above-mentioned problem and to improve the productivity of the automobile through reduction of his or her wear, for example, in Japanese Patent Publication (unexamined) No. Heisei 1-307108, as illustrated in FIG. 25, a roof module has been proposed, in which circuit bodies i are built-in a formed plated h. With this conventional roof module, the wiring work for the wire harness is to be eliminated, however, mounting work of other electrical modules and connecting work for the roof module to connectors still remain, which does not provide improved workability. In this connection, the parts mounted to the roof portion are mostly located on the front side of the ceiling portion.

SUMMARY OF THE INVENTION

The present invention has been made in consideration of the aforementioned problems, and the object thereof is to provide a roof module for automobile in which a function-intensive unit is formed to concentrate a variety of room fittings mounted on a body of an automobile, electrical modules, and control circuits for the electrical modules, and the unit is combined with a formed ceiling, which is mounted to the ceiling of the vehicle body, to easily distribute the wire harness and easily mount functional electrical modules such as room mirrors, resulting in improved workability.

To accomplish the above-mentioned object, a roof module for automobile according to the present invention comprises: a formed ceiling mounted to an inner surface of a ceiling portion of a vehicle; a function-intensive unit attached to a front driver's seat side of the formed ceiling, the function-intensive unit including a unit case with a plurality of functional parts and a control circuit board for the functional parts, and a unit side connector connected to the control circuit board at an upper surface of the unit case; a roof wire harness preliminarily locked to the formed ceiling through a preliminary locking member of the roof wire harness, the roof wire harness including a reception connector being connected to the unit side connector, and a harness connecting connector being connected to an outside wire harness; and a fixing member for fixing the formed ceiling and the reception connector to the ceiling portion, wherein fixing the formed ceiling and the reception connector to the ceiling portion through the fixing member causes the roof wire harness to be secured to the ceiling portion, and the connection of to the unit side connector to the reception connector allows the function-intensive unit to be mounted to the formed ceiling and electrically be connected to the roof wire harness.

With the above-mentioned roof module for automobile according to the present invention, the roof wire harness is preliminarily locked to the formed ceiling in advance, unlike the conventional roof modules for automobiles, it becomes unnecessary to distribute the roof wire harness directly to a vehicle body. As a result, not only mounting work of the wire harness itself can be simplified, but also the number of fixing members such as clips may be decreased.

In addition to the above, the connection between the unit side connector and the reception connector simultaneously achieves the mounting of the function-intensive unit and electrical connection, therefore, unlike the conventional roof modules for automobiles, it becomes unnecessary to connect connectors at ends of the wire harness after drawn out of holes formed on a formed ceiling.

Further, in the roof module for automobile described above, the preliminary locking member may be a cramp, and the formed ceiling may be provided with a cramp locking window, and the cramp and the cramp locking window can be engaged with each other to allow the roof wire harness to preliminarily be connected to the formed ceiling. With this construction, the roof wire harness may preliminarily be connected with ease through the connection between the cramp and the cramp locking window.

Still further, in the above-mentioned roof module for automobile, it is possible that the cramp comprises: a pair of resilient holding arms with a shape of a character U; a harness holding projection standing on one of the holding arms; flanges outwardly folded from tip portions of the resilient holding arms; and a cable stopper projection attached to a base of the harness holding projection.

In the aforementioned roof module for automobile, the cramp may comprise: a pair of resilient holding arms with a shape of a character U with a connecting portion with a shape of a character Ω; a harness holding projection standing on one of the holding arms; and a cable stopper projection attached to a base of the harness holding projection.

Further, in the roof module for automobile with the above construction, it is possible that at an end of the roof wire harness is provided the reception connector; a locking rib as the preliminary locking member is formed on the reception connector; a connector locking window is formed on the formed ceiling; and the engagement between the reception connector and the connector locking window causes the end of the roof wire harness to preliminarily be locked to the formed ceiling. With this construction, the reception connector may directly be locked preliminarily without other locking members.

Still further, the preliminary locking member may be a cramp with a pair of resilient holding arms attached to an end of the roof wire harness, and the engagement between the cramp and a side edge of the formed ceiling allows the end of the roof wire harness to preliminarily be connected to the formed ceiling. With this construction, in case that a part of the roof wire harness is to be connected to an outside wire harness for the connection to a power source or the like after fixed to the formed ceiling, the part to be connected is detachably preliminarily connected to a pair of resilient holding arms.

Further, the functional parts may include an information indicator; a selection switch for the information indicator; sensors detecting amount of solar radiation and smoke; an antenna for a radio set and for a GPS reception of a car navigation set; and a power room mirror.

Still further, the fixing member is preferably a plurality of screws.

In the above roof module for automobile, a circuit conductor of the roof wire harness may include a flat cable.

BRIEF DESCRIPTION OF THE DRAWINGS

The present invention will be more apparent from the ensuring description with reference to the accompanying drawings wherein:

FIGS. 12A to 12D are enlarged views of the cramp 36 for the harness shown in FIG. 1, in which FIG. 12A is a perspective view, FIG. 12B is a side view, and FIGS. 12C and 12D are explanatory views of the states that the cramp 36 is in use, respectively;

FIG. 13A to 13D are enlarged views of the cramp shown in FIG. 12 according to another embodiment of the present invention, in which FIG. 13A is a perspective view, FIG. 13B is a side view, and FIGS. 13C and 13D are explanatory views of the states that the cramp is in use, respectively;

FIG. 14A to 14D are enlarged views of the cramp shown in FIG. 12 according to a further embodiment of the present invention, in which FIG. 14A is a perspective view, FIG. 14B is a side view, and FIGS. 14C and 14D are explanatory views showing the states that the cramp is in use, respectively;

DETAILED DESCRIPTION OF PREFERRED EMBODIMENTS

Now, an embodiment of the present invention will be described below with reference to drawings.

Figure 1:
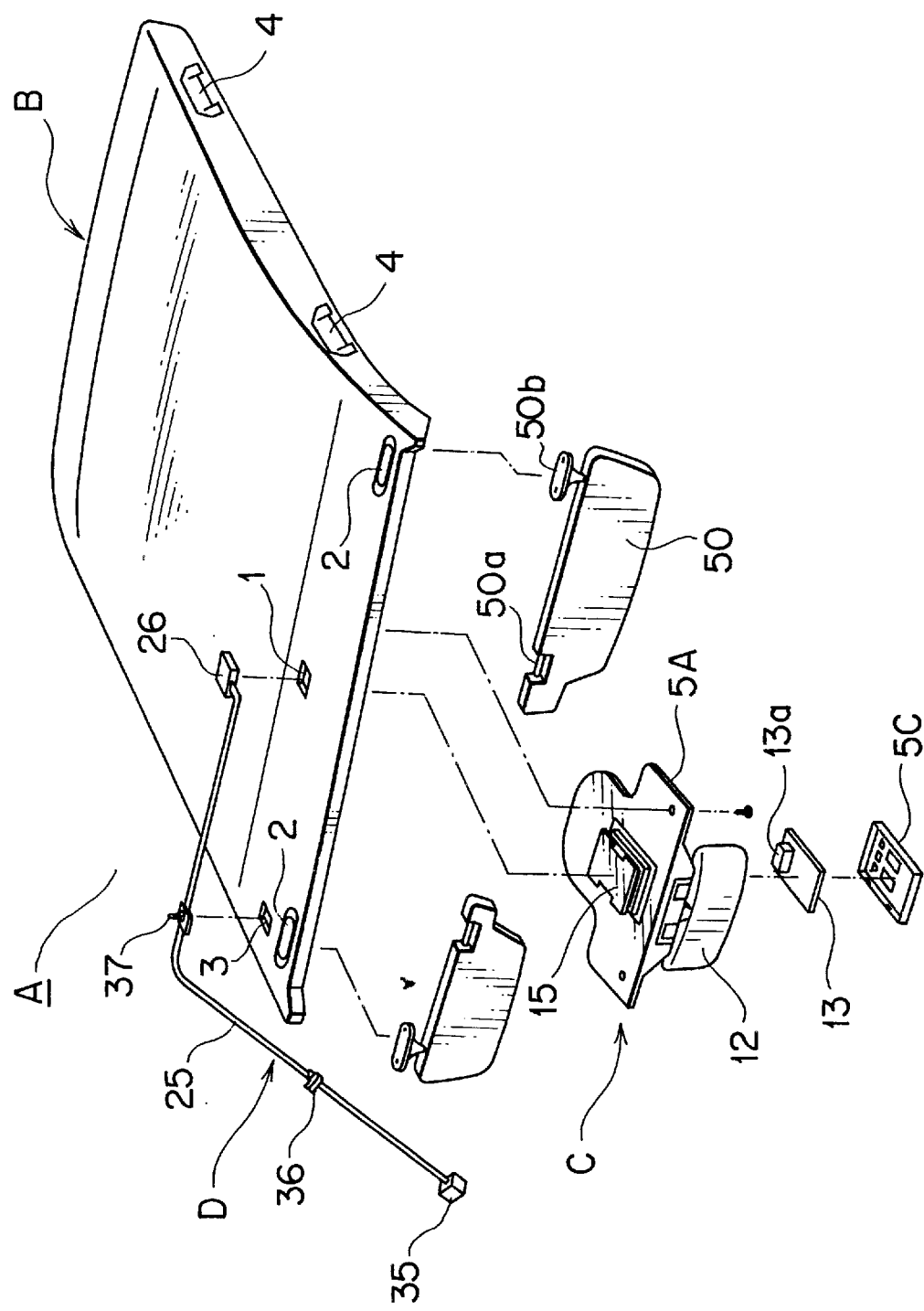
FIG. 1 is an exploded perspective view of a roof module for automobile according to an embodiment of the present invention.

FIG. 1 is an exploded perspective view of a roof module A for automobile according to an embodiment of the present invention.

The roof module A comprises a formed ceiling B, which is lined on the ceiling portion of an automobile, a function-intensive unit C, which is mounted to the front portion of the formed ceiling B on a driver's seat side, and a roof wire harness D. Besides the mounting, the function-intensive unit C simultaneously allows the unit side connector 15 and a reception connector of the roof wire harness D to be connected electrically.

The formed ceiling B is formed of synthetic resin so as to be along the shape of the ceiling of the automobile. The formed ceiling B is provided with a connector locking window 1 at the front central portion thereof, through holes 2 for mounting sun visors at both side thereof, and a cramp locking window 3 at the intermediate portion thereof, and the connector locking window 1 and the cramp locking window 3 constitute a locking section for the roof wire harness D Further, at both right and left edges on the formed ceiling B are formed channels 4 for securing assist grips not shown. To the connector locking window 1 is locked the reception connector 26 of the roof wire harness D and to the cramp locking window 3 is locked a harness-hugging-type cramp 37 described below.

Figure 2:
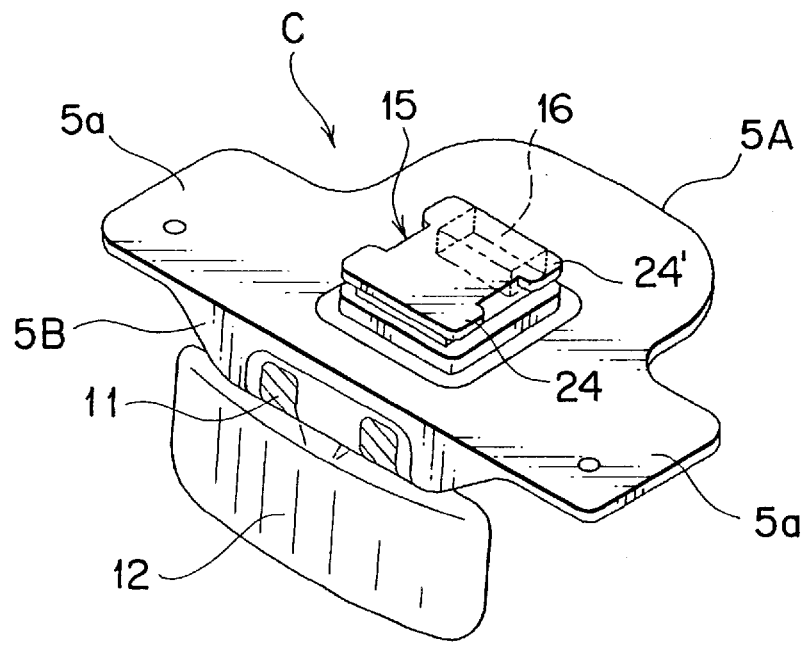
FIG. 2 is an enlarged perspective view of the function-intensive unit shown in FIG. 1.
Figure 3:
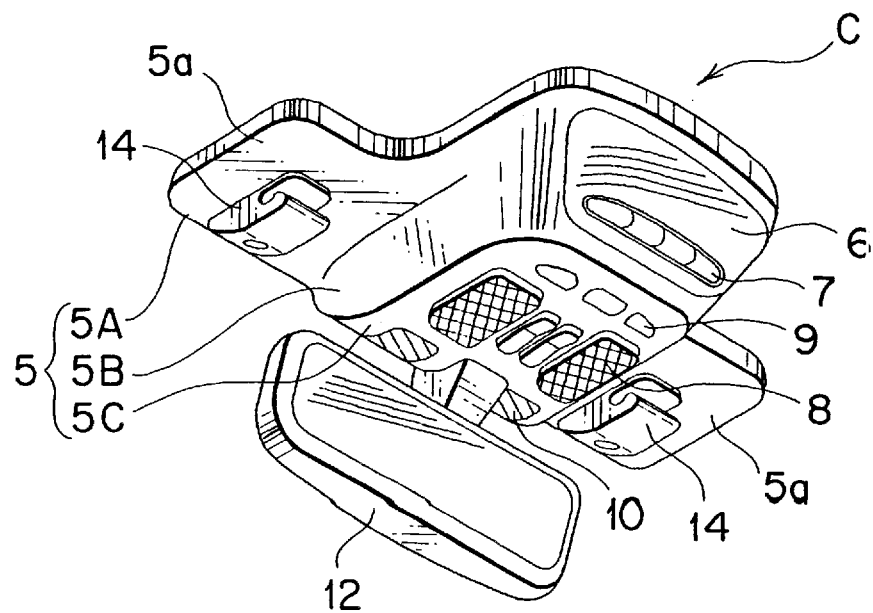
FIG. 3 is a perspective view of the function-intensive unit shown in FIG. 2 which is observed from behind the unit.

The function-intensive unit C is, as illustrated in FIGS. 2 and 3 also, constructed so as to have a variety of functional parts 6 to 12 in a unit case 5.

That is, the unit case 5 consists of a top plate portion 5A, a case main portion 5B at the center on the lower surface of the top plate portion 5A, and an under cover portion 5C. To the case main portion 5B is fixed an information indicator 6 and a selection switch 7 therefor on the front side observed from the driver's seat, and a map lamp 8 and its switch 9 on the lower surface side, and a sensor 10 and an antenna 11 on the front side on the lower surface. Further, to the case main portion 5B is rotatably mounted a power room mirror 12 on the front central portion thereof, and in the case main portion 5B is accommodated a control circuit board 13.

The sensor 10 detects the amount of solar radiation and smoke in the vehicle and these information are displayed on the information indicator 6. The antenna 11 is used for a radio set and for a GPS reception of a car navigation set. The control circuit board 13 is provided with a connector portion 13a which is connected to an inner circuit conductor on a printed circuit board with a built-in micro computer (ECU). The control circuit board 13 processes signals from the switches 7, 9 and the sensor 10 to control the aforementioned functional parts.

While, on the top plate portion 5A, on the lower surface 5a projecting on both right and left side of the case main portion 5B, sun visor holders 14 are integrally formed with the lower surface 5a. On the upper surface of the top plate portion 5A at the central portion thereof is formed the unit side connector 15.

Figure 4:
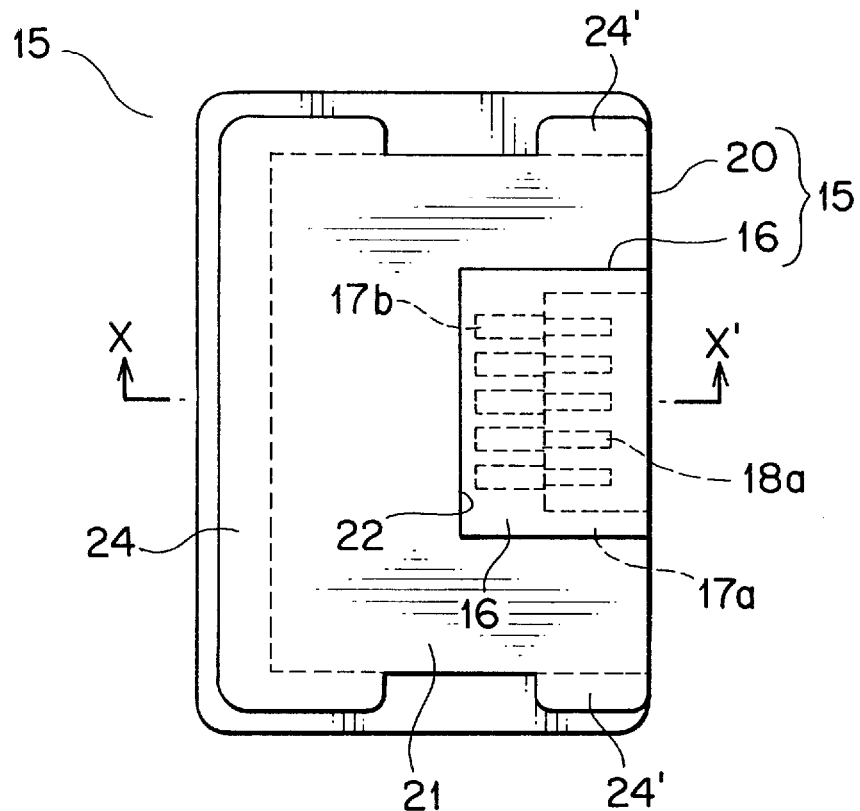
FIG. 4 is a plan view of the unit side connector 15 illustrated in FIG. 1.
Figure 5:
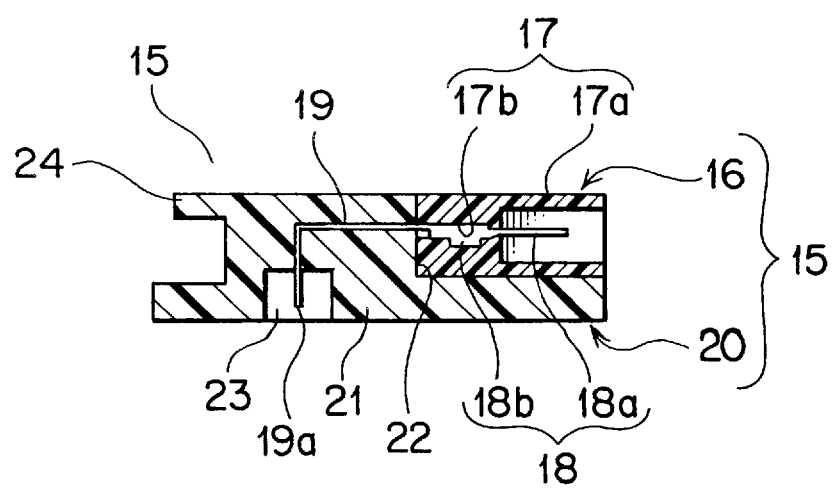
FIG. 5 is a cross-sectional view of the unit side connector 15 taken along the line X–X' in FIG. 4.

As illustrated in FIGS. 4 and 5, the unit side connector 15 consists of a first connector main body 16 and a guide holder 20 therefor. The connector making body 16 consists of an insulation housing 17 with a hood 17a on the front locking side thereof and with a plurality of terminal accommodating cavities 17b therein, and a male terminal 18. A front half portion of the male terminal 18, that is, a tab portion 18a is positioned in the hood 17a, and a rear half portion thereof, that is, a lead wire connecting portion 18b is accommodated in the terminal accommodating cavity 17b and is locked thereto. To the lead wire connecting portion 18b is connected an L-shaped pin jack 19, and a tip 19a of the L-shaped pin jack 19 extends to a connector reception portion 23 which is concaved on the lower surface of the guide holder 20, and the L-shaped pin jack 19 is engaged with and connected to the connector portion 13a of the control circuit board 13.

In the guide holder 20, a concave portion 22 is formed on a block body 21, which is sufficiently largely formed in comparison to the first connector main body 16, at the central portion on the upper surface on the front side observed from the driver's seat to secure the first connector main body 16 therein, and the connector reception portion 23 is formed on the lower surface on the rear side. On an edge of the outer periphery of the block body 21 projects a first guide flange 24 from the rear surface to the rear half portion of both right and left sides of the outer periphery, and a second flange 24' projects on the front half portion on both right and left sides thereof.

Referring to FIG. 1 again, the roof wire harness D is provided with a reception connector 26 at an end of a flat cable 25, a harness connecting connector 35 at the other end thereof, and a plurality of cramps 36 and a harness-hugging cramp 37 at the intermediate portion thereof. The harness connecting connector 35 is mounted on the side of a piller E (FIG. 19) and connected to an instrument panel wire harness not shown with an ordinary connection through connectors.

The roof wire harness D is preliminarily fixed to the formed ceiling B until the formed ceiling B is secured to the ceiling portion, and the cramp 36 and the harness-hugging-type cramp 37 constitute a locking member for wire harnesses.

Figure 6:
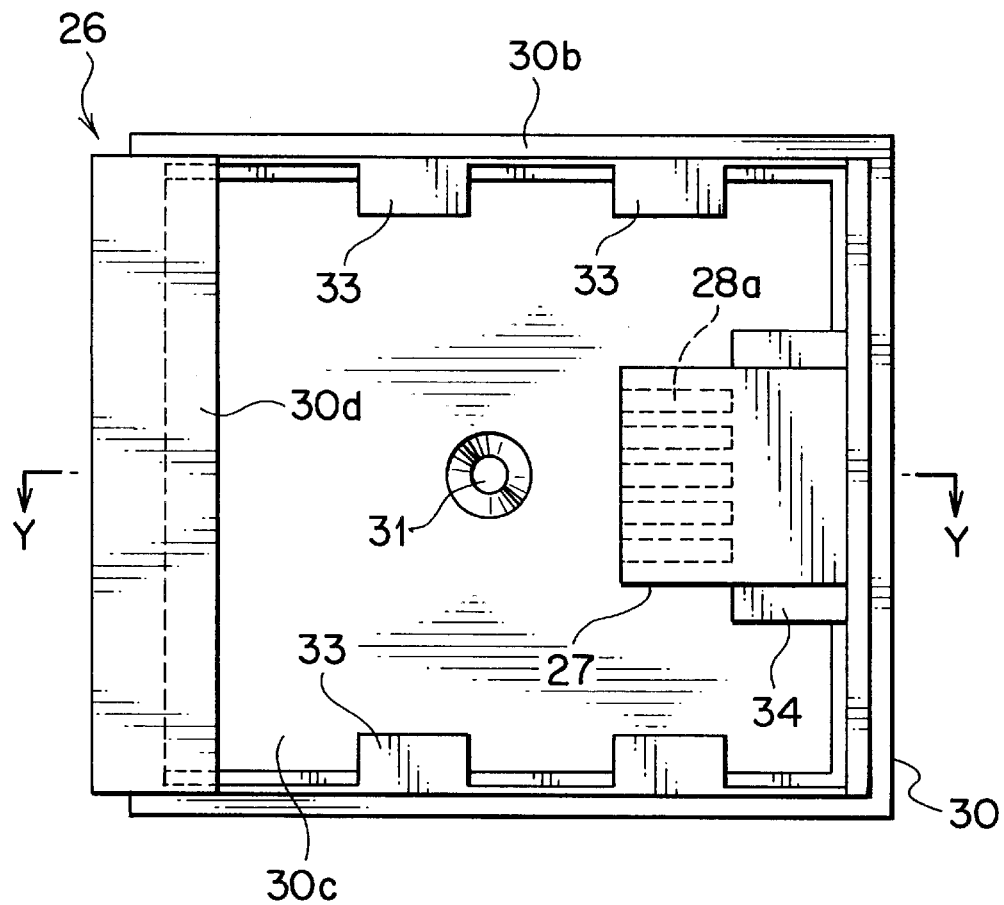
FIG. 6 is a plan view of the reception connector 26 mounted to the roof wire harness D shown in FIG. 1.
Figure 7:
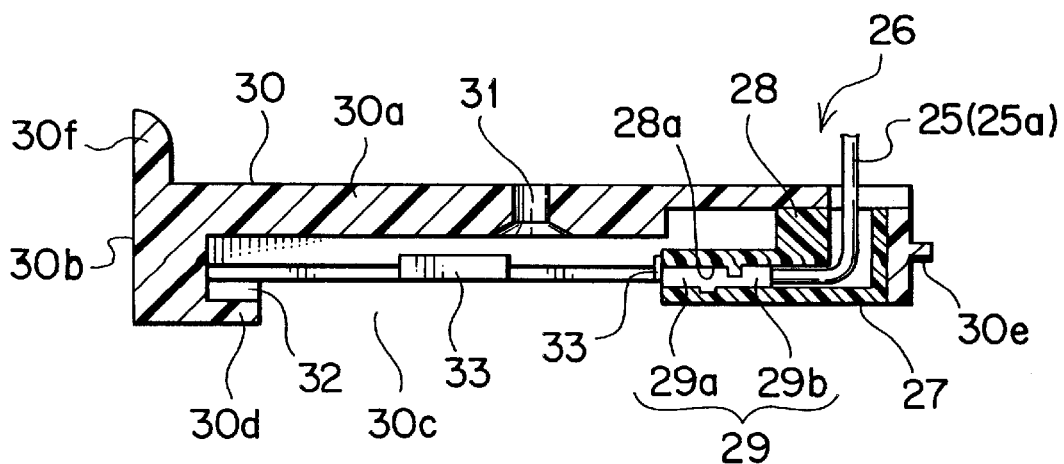
FIG. 7 is a cross-sectional view of the reception connector 26 taken along the line Y–Y' in FIG. 6.

As illustrated in FIGS. 6 and 7, the reception connector 26 consists of a second connector main body 27 and a connector cover 30 therefor. The second connector main body 27 is constructed such that a female terminal 29 is accommodated in a plurality of terminal accommodating cavities 28a of an insulation housing 28 and engaged therewith. The female terminal 29 is provided with an electrical contact portion 29a at the front portion thereof, and to the rear wire connecting portion 29b is connected an electrical wire 25a of the flat cable 25.

The connector cover 30 is provided with a ceiling wall 30a and a peripheral wall 30b thereof, and is a box-shaped case with a lower opening. The connector cover 30 is sufficiently largely formed in comparison with the second connector main body 27. A tapped hole 31 is formed on the ceiling wall 30a, and a lower opening 30c, on a tip side thereof, is provided with an insertion guide channel 32 between the opening 30 and the ceiling wall 30a through a support edge 30d. On both right and left inner surfaces of the peripheral wall 30b are formed supporting pieces 33 projecting back and forth. Each of these supporting pieces 33 positions between the support edge 30d and the ceiling wall 30a. The distance between the right and left inner surfaces of the peripheral wall 30b is designed to be almost the same as outer distance between right and left flanges 24 (24') of the unit side connector 15.

Figure 15:
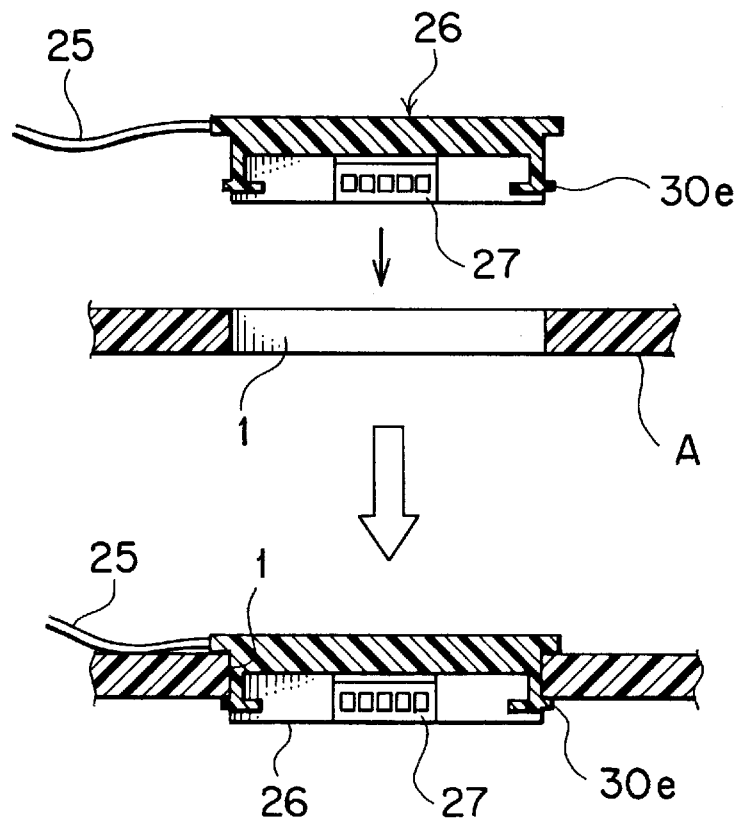
FIG. 15 is a drawing for explaining a preliminary locking structure between the reception connector 26 and the formed ceiling B shown in FIG. 1.

Further, on the outer peripheral surface of the peripheral wall 30b is, as illustrated in FIG. 15 also, mounted a locking rib 30e as a locking member which is engaged with the connector locking window 1, and on the inner surface of the rear wall of the peripheral wall 30b is formed an engagement portion 34, and the second connector main body 27 is engaged with the engagement portion 34. In this engaged or locked state of the second connector main body 27, the unit side connector 15 is accommodated from downside into the front space, that is, into the lower opening 30c. It is preferable that on the tip upper surface of the ceiling wall 30a is formed a rotation restricting piece working as positioning member also.

Figure 12A:
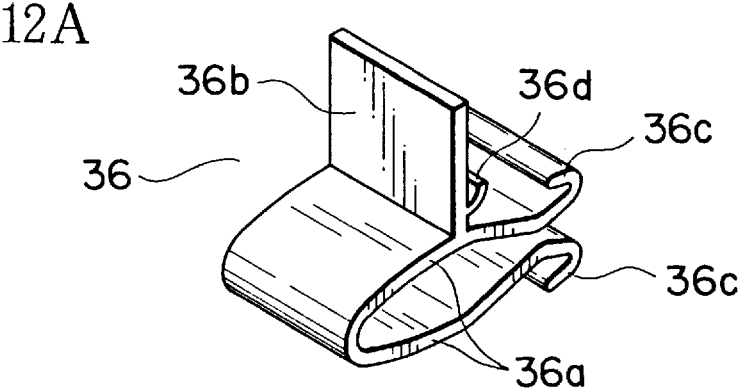

The cramp 36 is one of the locking members for preliminarily securing the roof wire harness D on the formed ceiling B, and as illustrated in FIG. 12(A), the harness fixing piece 36b is mounted so as to stand on the outer surface of one of a pair of resilient supporting arms 36a which are formed to have U-shape through formation with synthetic resin material, and a flange 36c is formed so as to be folded outward at an end of each of the resilient supporting arms 36a. Further, a projection 36d for a cable stopper is formed on the raising base portion of the harness fixing piece 36b.

Figure 12B:
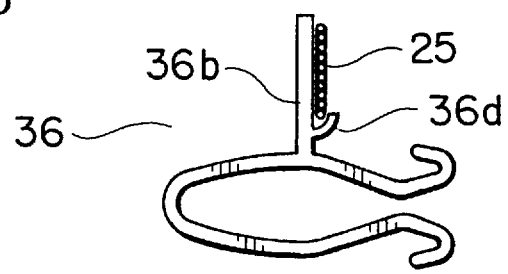
Figure 12C:
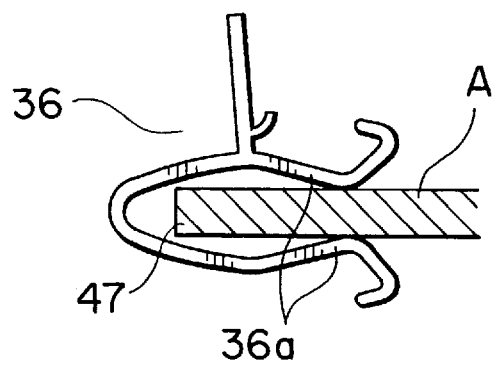

When the cramp 36 is used, as illustrated is in FIG. 12(B), the flat cable 25 is fixed to the harness fixing piece 36b through taping or bonding with adhesives. With the provision of the projection 36d, the positioning work for the flat cable 25 is easily carried out. As shown in FIG. 12(C), a side edge 47 (see FIG. 17) of the formed ceiling B is inserted between a pair of resilient supporting arms 36a to preliminarily lock the flat cable 25 (or the roof wire harness D), and as illustrated in FIG. 12 (D), the flange 36c at the tip of the resilient supporting arms 36a is inserted into a hole p on a panel P (or a bracket) of a vehicle body to distribute the flat cable 25 on the panel P and fix the flat cable 25 thereto.

FIGS. 13(A) to 13(D) show another embodiment of the above-mentioned cramp. That is, the cramp 36' is not provided with the above flange 36c at the tips of a pair of resilient supporting arms 36a, and a connecting portion 36e of the resilient supporting arms 36a is formed so as to have a shape of character Ω.

Figure 13A:
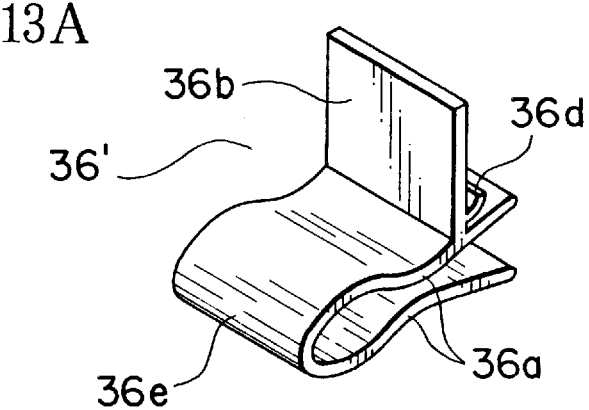
Figure 13B:
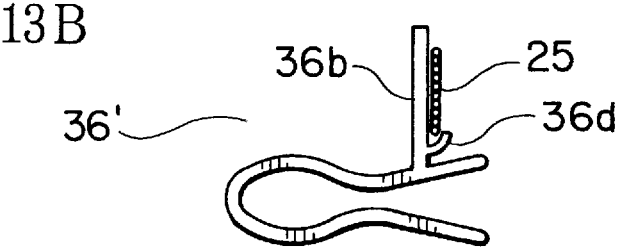
Figure 13C:
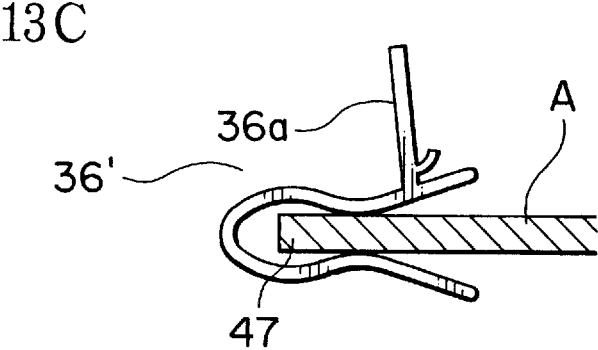
Figure 13D:
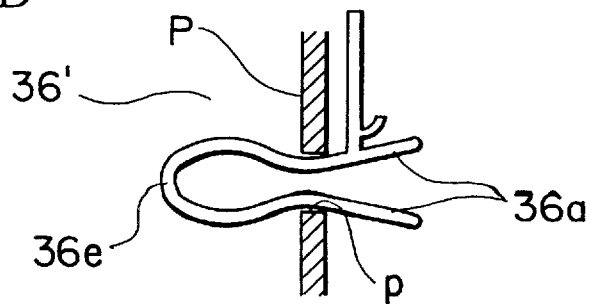
Figure 14A:
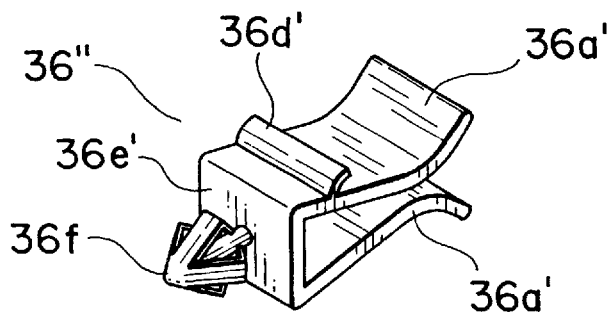
Figure 14B:
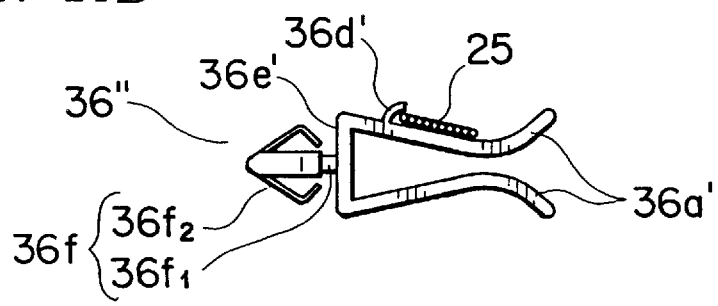
Figure 14C:
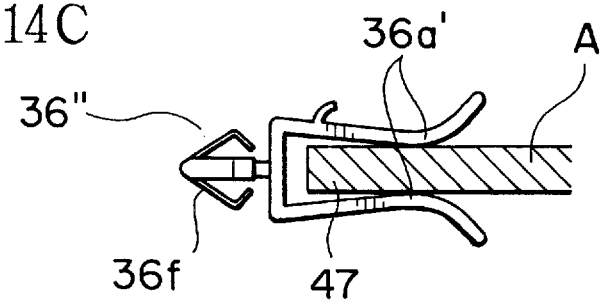
Figure 14D:
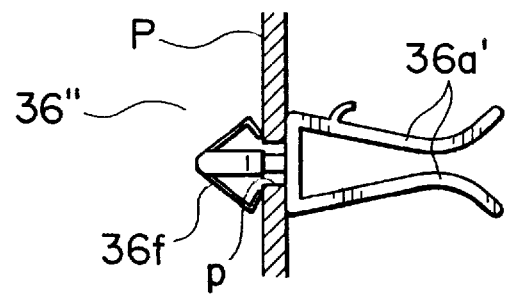

In this embodiment, to the harness fixing piece 36b is secured the flat cable 25 (see FIG. 13(B)), and the side edge 47 of the formed ceiling B is inserted between the resilient supporting arms 36a in the same manner as described above (see FIG. 13(C)), however, the engagement with the panel hole p of the panel P is performed by the insertion of the connecting portion 36e (see FIG. 13(D), and unlike the cramp 36, the cramp 36' can be drawn off due to no flange 36c, which is suitable for preliminary lock.

FIGS. 14(A) to 14(D) show a further embodiment of the above-mentioned cramp. That is, the cramp 36" is constructed such that a connecting portion 36e' of a pair of resilient supporting arms 36a' is formed to be a flat plate, and on the connecting portion 36e' with the shape of a flat plate projects a clip 36f consisting of supporting column 36f1 and a plurality of arrow feathers 36f2, and on an outer surface of one of the resilient supporting arms 36a' is formed a projection 36d' as a cable stopper.

In this embodiment, the above-mentioned functions are separately performed by the resilient supporting arms 36a for preliminarily locking the cramp 36" to the side edge 47 of the formed ceiling B or the like, and the clip 36f for locking the cramp 36" to the panel hole p, therefore, further variety of changes in design are possible. The flat cable 25 is fixed to one of the resilient supporting arm 36a' in the same manner described above.

Figure 16:
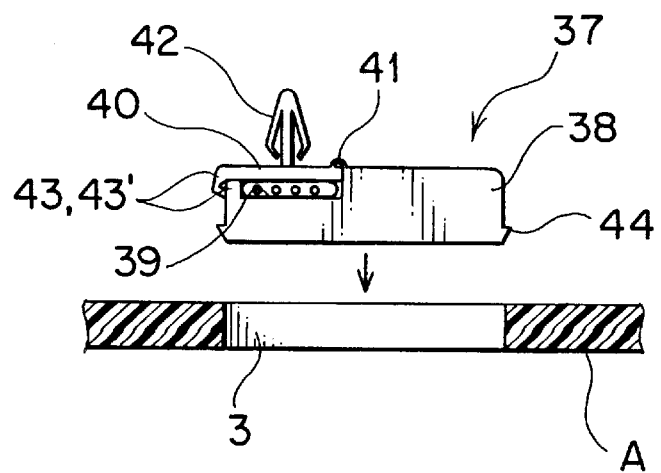
FIG. 16 is a drawing for explaining a preliminary locking structure between the harness-hugging-type cramp 37 and the formed ceiling B shown in FIG. 1.

The harness-hugging-type cramp 37 is also one of the locking members, and as illustrated in FIG. 16, on one side of the upper surface of the base plate 38 made of synthetic resin is formed a cable wiring channel 39, and a channel cover 40 is mounted in such a manner as to be openable and closable through a hinge 41, and on the channel cover 40 projects a clip 42 with the same construction as the clip 36f of the cramp 36". Reference numerals 43 and 43' show locking projections constituting locking member for the channel cover 40 and the base plate 38, and at the lower end edge of the base plate 38 is mounted a locking rib 44 which is engaged with the cramp locking window 3.

With the above-mentioned construction, the engagement and connection between the unit side connector 15 of the function-intensive unit C and the reception connector 26 of the roof wire harness D is carried out in the following manner.

Figure 8:
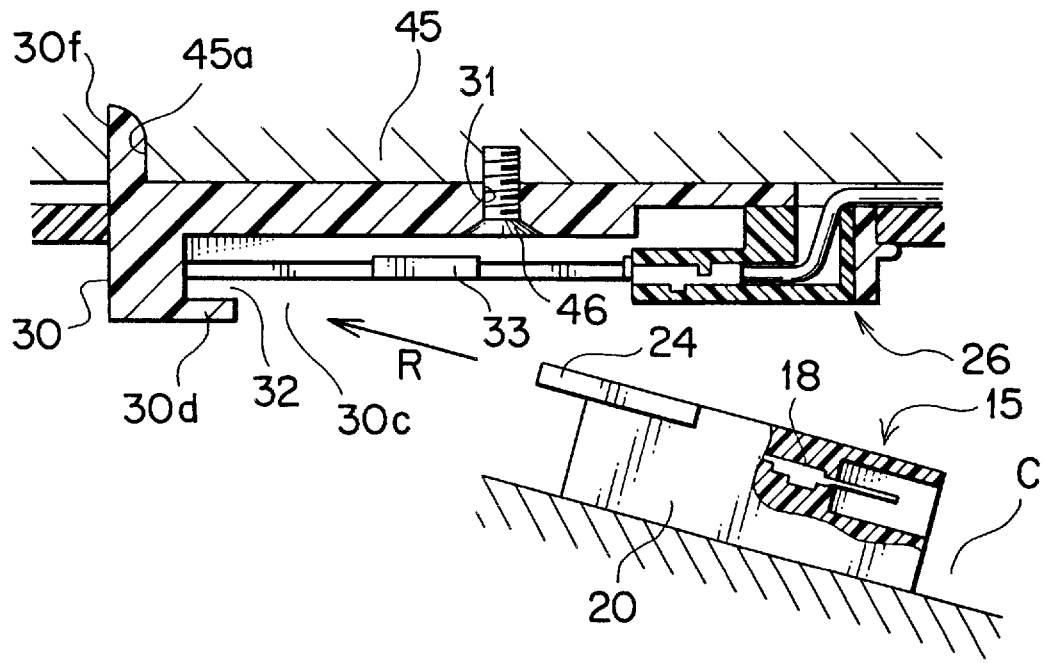
FIG. 8 is a cross-sectional view showing a state that the connection of the reception connector 26 and the unit side connector 15 starts.

At first, as illustrated in FIG. 8, the reception connector 26 is fixed to the bracket 45 of the vehicle body through a screw 46 with the aid of the tapped hole 31. The rotation restricting piece 30f of the connector cover 30 is inserted into the hole 45a of the bracket 45, which causes the positioning of the reception connector 26 to easily be carried out, and only one screw 46 is sufficient for secure attachment.

Under this condition, the unit side connector 15 is inserted with inclined posture thereof, in a direction indicated by the arrow P, into the lower opening 30c from the downside of the connector cover 30.

Figure 9:
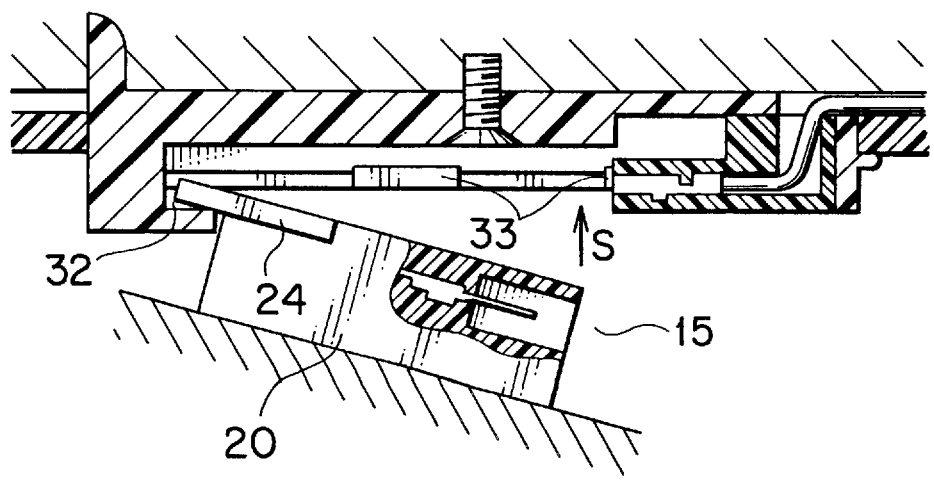
FIG. 9 is a cross-sectional view showing the next process following the state shown in FIG. 8.

Then, as illustrated in FIG. 9, a tip portion of the first guide flange 24 of the guide holder 20 is inserted into the insertion guide channel 32 and is positioned therein, so that the opposite side of the unit side connector 15 is lifted as indicated by the arrow S. As a result, as shown in FIG. 10, the unit side connector 15 is closely contact with the inner surface of the ceiling wall 30a of the reception connector 26, which causes the both connector main bodies to oppose to each other on the same axis.

At the lifting and rotating operations of the unit side connector 15, the first and second flanges 24 and 24' and the supporting piece 33 on the reception connector 26 side are alternately located, so that there is no interference among them, and the both guide flanges 24, 24' are to be situated just between the ceiling wall 30a of the connector cover 30 and the supporting piece 33.

Figure 10:
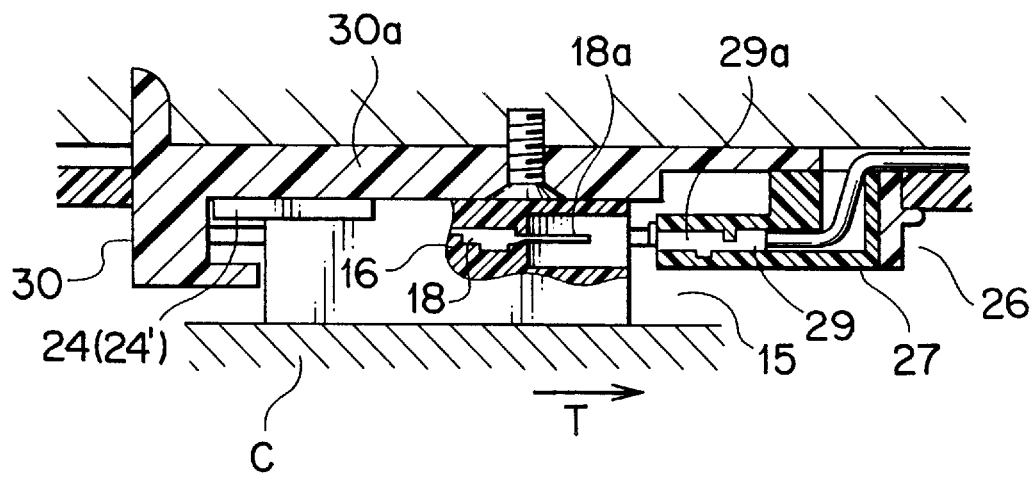
FIG. 10 is a cross-sectional showing the next process following FIG. 9.
Figure 11:
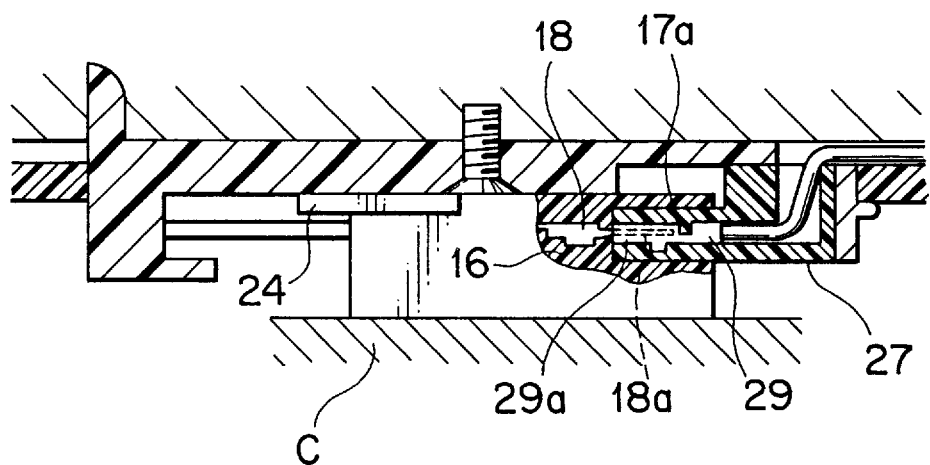
FIG. 11 is a cross-sectional view showing the connection between the reception connector 26 and the unit side connector 15 is completed.

Finally, as indicated by the arrow T in FIG. 10, when the unit side connector 15 is drawn toward a worker, as illustrated in FIG. 11, a state that the second connector main body 27 proceeds in the hood 17a of the first connector main body 16 is obtained, which allows the tab portion 18a of the male terminal 18 to be inserted into the electrical contact portion 29a of the female connector 29 and the both terminals 24, 24' to be connected to each other. Simultaneously, the first and second guide flanges 24, 24' are supported on the supporting pieces 33 disposed in a direction that the unit side connector 15 moves.

The disconnection between the unit side connector 15 and the reception connector 26 can be carried in a reverse manner with the above-mentioned procedure, that is, from FIG. 11 to FIG. 8.

At the engagement and connection of the unit side connector 15, the distance between the right and left inner walls of the peripheral wall 30b of the connector cover 30 is designed so as to be almost the same as the outer distance between the right and left guide flanges 24 (24') of the unit side connector 15, so that the unit side connector 15 is smoothly inserted without shake.

Next, with reference to FIGS. 17 to 20, the process of mounting the roof module A will be explained.

Figure 17:
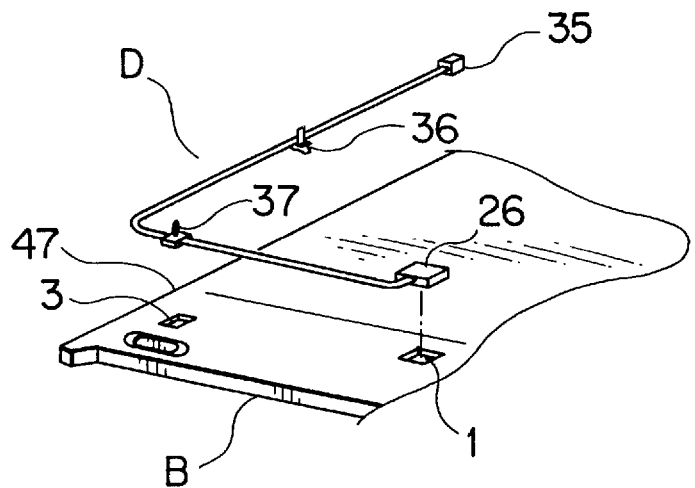
FIG. 17 is a drawing for explaining the process that the roof module A is mounted to a vehicle body.

At first, in FIG. 17, the roof wire harness D is preliminary fixed to the formed ceiling B.

That is, the reception connector 26 and the harness-hugging-type cramp 37 of the roof wire harness D are inserted into the connector locking window 1 and the cramp locking window 3 on the front side of the formed ceiling B, respectively, and are preliminarily locked through the locking ribs 30e, 40 as explained with reference to FIGS. 15 and 16.

While, on the cramp 36 side of the roof wire harness D is mounted the cramp 36, so that the side edge 47 of the formed ceiling B is inserted into the resilient supporting arms 36a and the wire harness D is preliminarily locked along the side edge 47. At the preliminary locking of the roof wire harness D, magic tape or bonding tape may be attached to the harness itself or the formed ceiling B in advance.

Figure 18:
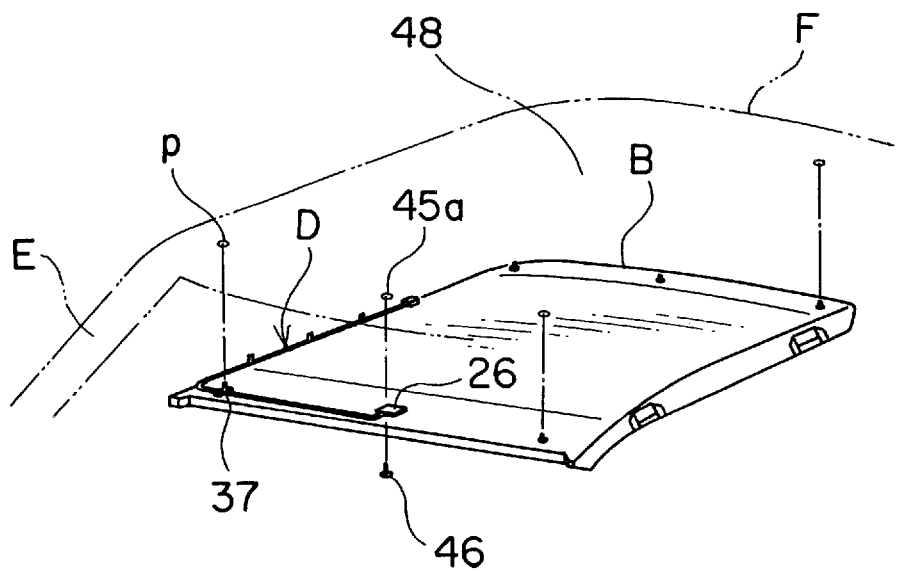
FIG. 18 is a drawing for explaining a next process following FIG. 17.

Next, as shown in FIG. 18, the formed ceiling B with the roof wire harness D preliminarily fixed is secured to a ceiling portion 48 of the vehicle body F while positioning thereon through cramps and screws not shown.

Figure 12D:
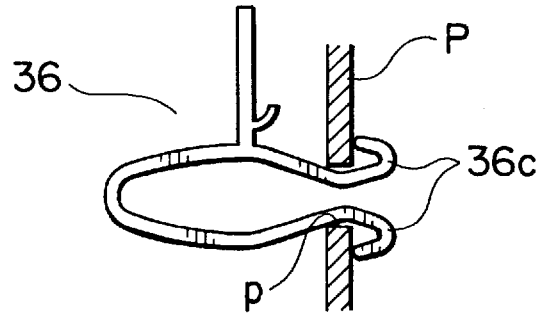

On the ceiling portion 48 are formed the hole 45a of the bracket 45 as explained with reference to FIG. 8 and the panel hole p shown in FIG. 12(D) in advance. Therefore, at the same time as the mounting and fixing of the formed ceiling B through the cramps and the like, the rotation restricting piece 30f of the reception connector 26 is inserted into the hole 45a and is positioned therein to cause the clip 42 of the harness-hugging-type cramp 37 to be locked to the panel hole p. Then, the reception connector 26 is secured through screws as illustrated in FIG. 8, which completes the mounting of the formed ceiling B.

Figure 19:
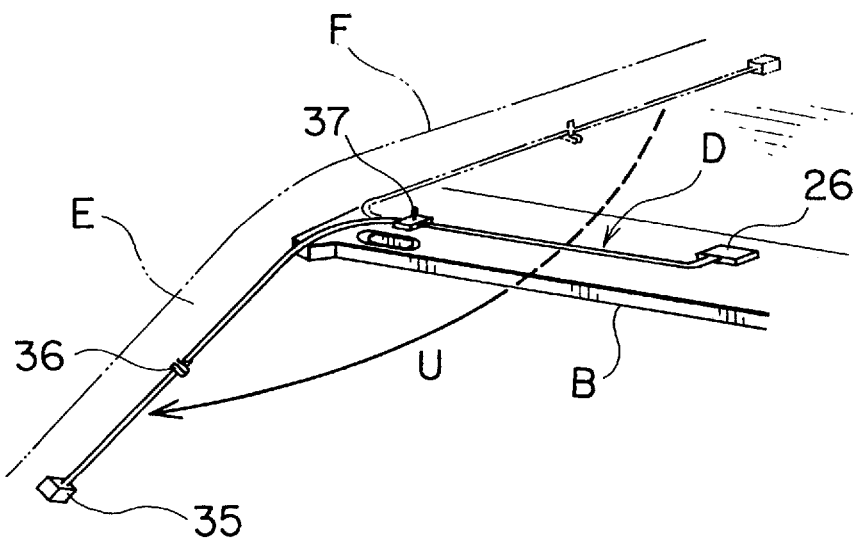
FIG. 19 is a drawing for explaining a next process following FIG. 18.

Next, as shown in FIG. 19, a part of the roof wire harness D which is preliminarily locked through the cramp 36 at an edge of the formed ceiling B is removed and is folded forward so as to be distributed on a pillar E side, which allows the harness connecting connector 35 to be connected to an inner panel wire harness not shown through connectors.

Figure 20:
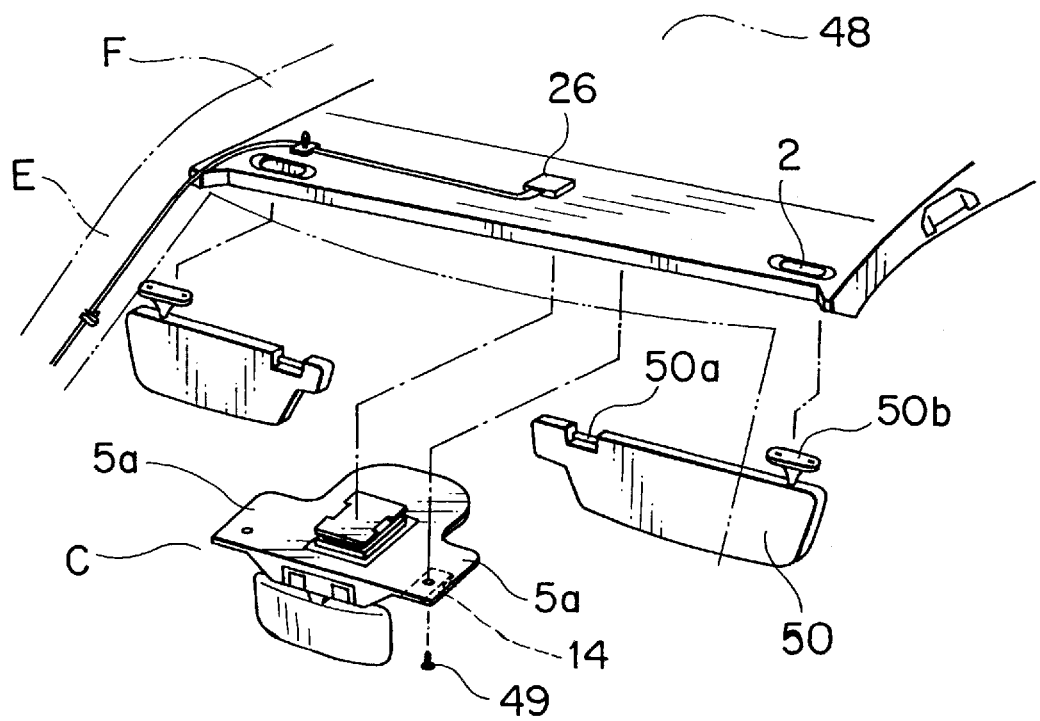
FIG. 20 is a drawing for explaining a final process following FIG. 19.

Then, at a front portion of the formed ceiling B on the driver's side, after the unit side connector 15 of the function-intensive unit C is engaged with and connected to the reception connector 26 in the same manner as described with reference to FIGS. 8 to 11, as shown in FIG. 20, both wing portions 5a of the function-intensive unit C are secured to the formed ceiling B through a screw 49.

Finally, a hook pin 50a of one of the sun visors 50 is engaged with a sun visor holder 14 on the lower surface of the wing portion 5a, and the other fixing member 50b is secured to the ceiling portion 48 through the through hole 2 and a screw in the same manner as described above, which causes the mounting of the roof module A to be completed.

In order to remove the formed ceiling B while departing the cramp for maintenance work or the like, the reception connector 26 is secured to the ceiling portion 48 through a screw 46, and the harness-hugging-type cramp 37 is locked to the panel hole p through the screw 46. Therefore, the roof wire harness D remains on the vehicle body F side as it is, so that only formed ceiling B may be removed, resulting in easy maintenance work.

In the above embodiment, the flat cable 25 is used as a circuit conductor of the roof wire harness D, however, a cable to which the present invention is applied is not limited to the flat cable, but the present invention may be applied to a bundle of ordinary wires. Further, an FFC may be used as the flat cable 25.

Figure 21:
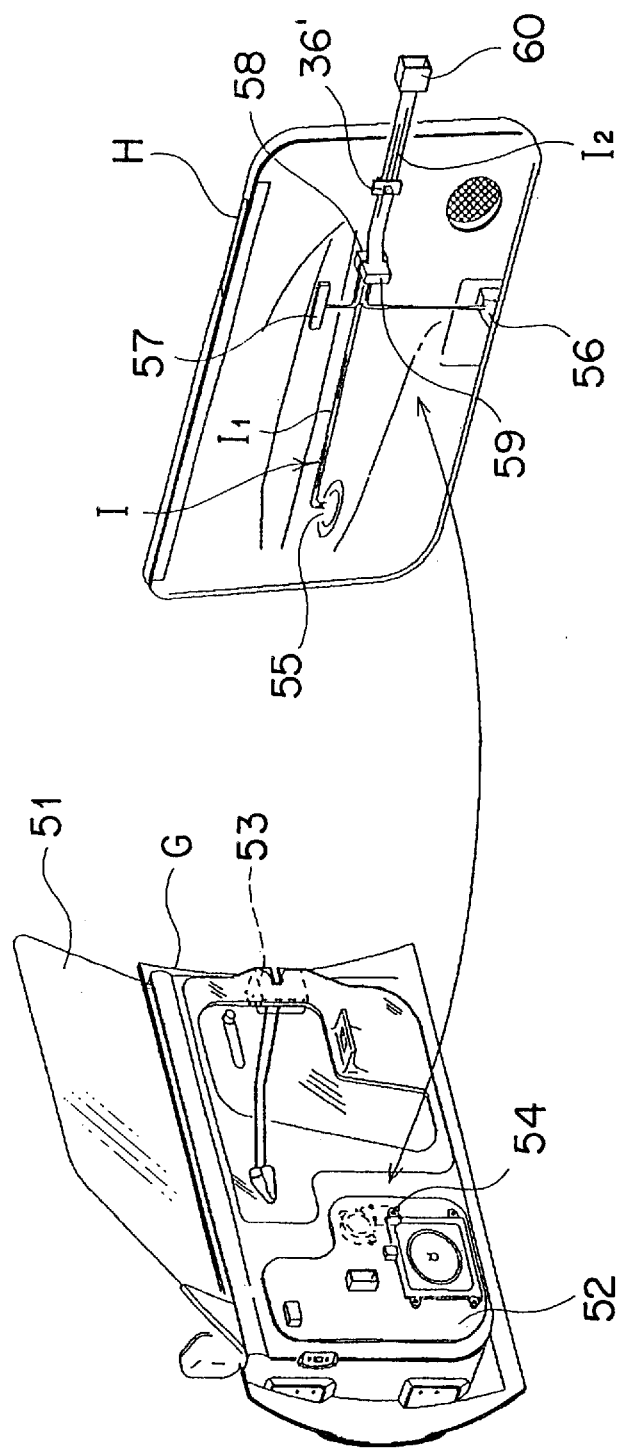
FIG. 21 is a drawing for explaining a method of mounting the door wire harness according to another embodiment of the present invention.
Figure 22:
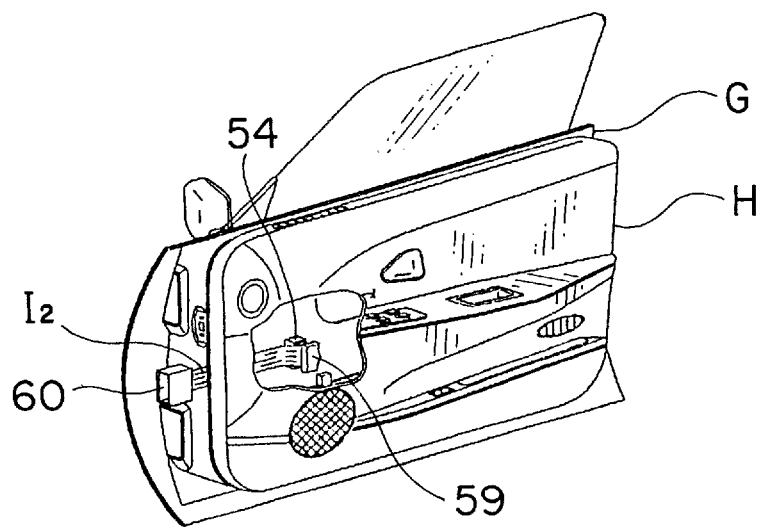
FIG. 22 is a drawing for explaining a stated that the door wire harness in FIG. 21 is mounted to a door.
Figure 23:
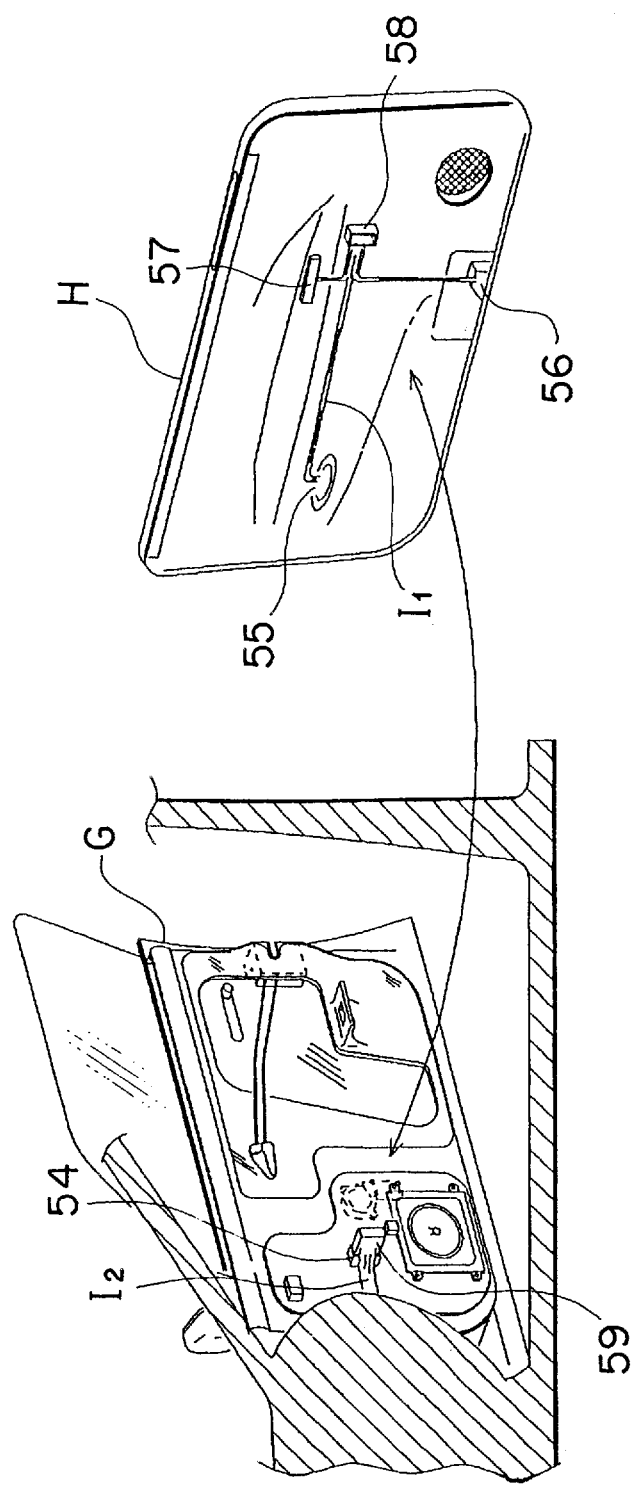
FIG. 23 is a drawing for explaining a stated that the door wire harness is removed from the door at a maintenance work.
Figure 24:
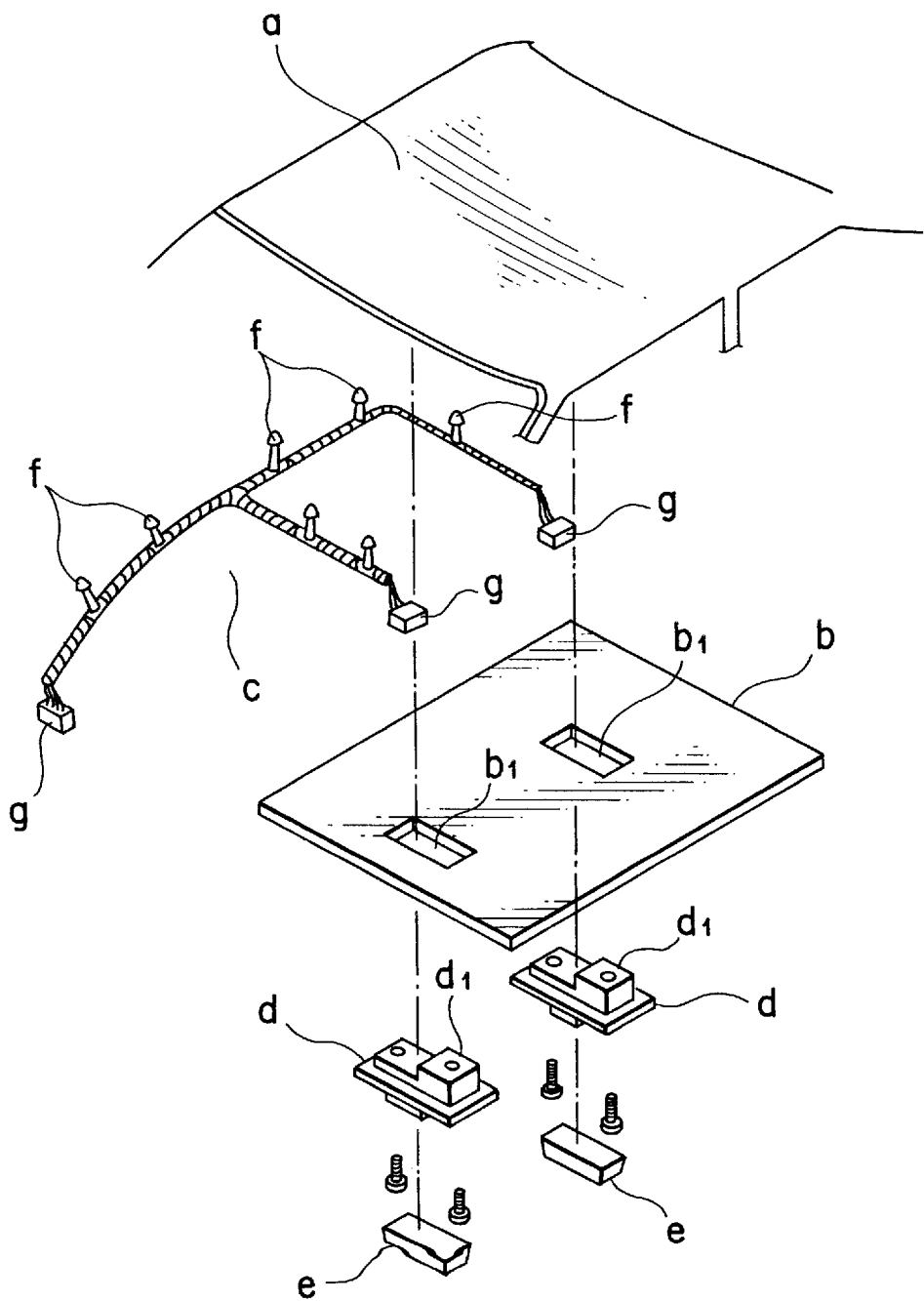
FIG. 24 is an exploded perspective view of a conventional roof module.
Figure 25:
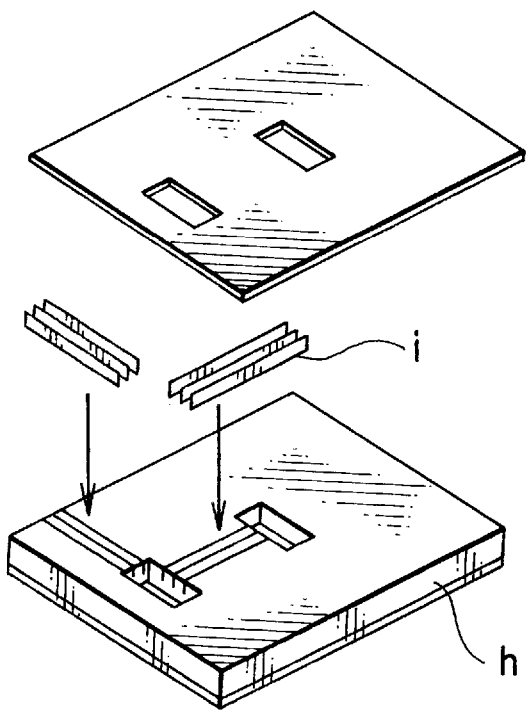
FIG. 25 is an exploded perspective view of another conventional roof module.

FIGS. 21 to 23 show an example in which the preliminary locking mechanism of the roof wire harness D to the formed ceiling B is applied to a door wire harness.

In FIG. 21, in a door frame G is accommodated electrical modules such as a regulator unit 52 of a power window 51 and a door locking device 53, and the regulator unit 52 is provided with an intensive connector 54 for the electrical modules in the door frame G. Reference symbol H shows a trimming board which is attached to the door frame G on the vehicle room side, and on the trim board H is distributed a flat door wire harness I and are disposed electrical modules such as a courtesy lamp 55, a flat lamp 56, and an optional switch 57.

The door wire harness I consists of a fixed portion I1 which is fixed to the trim board H, and a harness connecting portion I2 which is removable and is connected to a cowl side wire harness not shown. An end of the harness connecting portion I2 is connected to the fixed portion I1 through a connector 58 and a double-face connector 59, and the harness connecting portion I2 is provided with a connector 60 for the cowl side wire harness at the other end thereof, and the intermediate portion of the harness connecting portion I2 is preliminarily engaged with the panel hole p on the trim board H through the cramp 36' as illustrated in FIG. 13(D).

Then, when the trim board H is fixed through screws or the like as illustrated in FIG. 22, one side of the double-face connector 59 of the harness connecting portion I2 is engaged with and connected to the intensive connector 54 on the door frame G side.

When the trim board H is removed at maintenance work or the like as illustrated in FIG. 23, the harness connecting portion I2 preliminarily engaged through the cramp 36' remains on the door frame G side, and only the fixed portion I1 is removed together with the trim board H. That is, in the harness connecting portion I2, forces engaging the intensive connector 54 with the double-face connector 59 and engaging the intensive connector 54 with the connector 60 are considerably stronger than a force for preliminary engagement through the cramp 36', so that the harness connecting portion I2 is removed from the trim board H. As a result, like the embodiment shown in FIG. 20, inspection and maintenance works for the door frame G and the trim board H can be carried out with ease.

What is claimed is:

1. A roof module for automobile comprising:

a formed ceiling mounted to an inner surface of a ceiling portion of a vehicle;

a function-intensive unit attached to a front driver's seat side of said formed ceiling, said function-intensive unit including a unit case with a plurality of functional parts and a control circuit board for said functional parts, and a unit side connector connected to said control circuit board at an upper surface of the unit case;

a roof wire harness preliminarily locked to said formed ceiling through a preliminary locking member of said roof wire harness, said roof wire harness including a reception connector being connected to said unit side connector, and a harness connecting connector being connected to an outside wire harness; and a fixing member for fixing said formed ceiling and said reception connector to said ceiling portion, wherein fixing the formed ceiling and the reception connector to the ceiling portion through the fixing member causes the roof wire harness to be secured to the ceiling portion, and the connection of the unit side connector to the reception connector allows the function-intensive unit to be mounted to the formed ceiling and to electrically be connected to the roof wire harness.

2. The roof module for automobile as claimed in claim 1, wherein said preliminary locking member is a cramp, and said formed ceiling is provided with a cramp locking window, and said cramp and said cramp locking window are engaged with each other to allow said roof wire harness to preliminarily be connected to said formed ceiling.

3. The roof module for automobile as claimed in claim 2, wherein said cramp comprises:

a pair of resilient holding arms with a shape of a character U;

a harness holding projection standing on one of said holding arms;

flanges outwardly folded from tip portions of said resilient holding arms; and a cable stopper projection attached to a base of said harness holding projection.

4. The roof module for automobile as claimed in claim 2, wherein said cramp comprises:

a pair of resilient holding arms with a shape of a character U with a connecting portion with a shape of a character Ω;

a harness holding projection standing on one of said holding arms; and a cable stopper projection attached to a base of said harness holding projection.

5. The roof module for automobile as claimed in claim 1, wherein at an end of said roof wire harness is provided said reception connector; a locking rib as the preliminary locking member is formed on the reception connector; a connector locking window is formed on said formed ceiling; and the engagement between the reception connector and the connector locking window causes the end of the roof wire harness to preliminarily be locked to the formed ceiling.

6. The roof module for automobile as claimed in claim 1, wherein said preliminary locking member is a cramp with a pair of resilient holding arms attached to an end of said roof wire harness, and the engagement between the cramp and a side edge of the formed ceiling allows said end of the roof wire harness to preliminarily be connected to the formed ceiling.

7. The roof module for automobile as claimed in claim 1, wherein said functional parts include an information indicator; a selection switch for said information indicator; sensors detecting amount of solar radiation and smoke; an antenna for a radio set and for a GPS reception of a car navigation set; and a power room mirror.

8. The roof module for automobile as claimed in claim 1, wherein said fixing member is a plurality of screws.

9. The roof module for automobile as claimed in claim 1, wherein a circuit conductor of said roof wire harness includes a flat cable.

* * * * *